Dec. 17, 1940.    J. L. BIBLE    2,225,582
GRAVITY METER CLAMP
Filed March 9, 1940
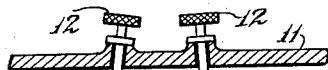
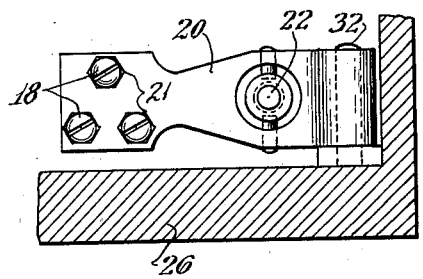
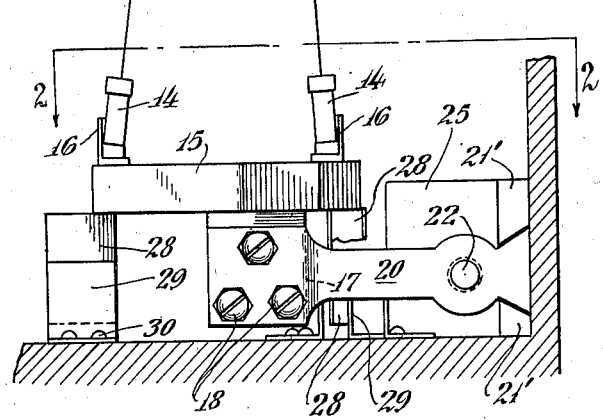
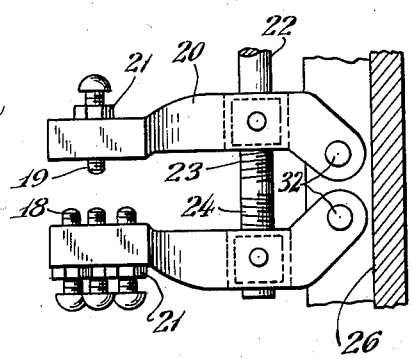
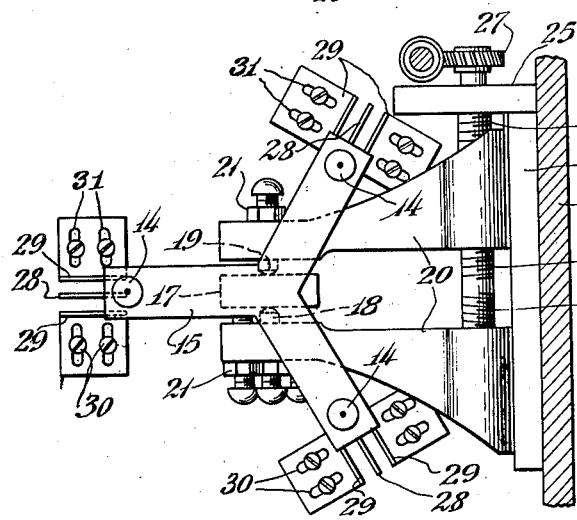
Inventor:
John L. Bible
By Geo. L. Parkhurst
Attorney.

Patented Dec. 17, 1940

2,225,582

UNITED STATES PATENT OFFICE 2,225,582

GRAVITY METER CLAMP

John L. Bible, Tulsa, Okla., assignor to Stanolind Oil and Gas Company, Tulsa, Okla., a corporation of Delaware Application March 9, 1940, Serial No. 323,094

4 Claims. (Cl. 265—1.4)

This invention relates to clamping and damping mechanisms for sensitive force-measuring instruments and particularly for gravimeters.

In various geophysical and other instruments involving an elastically suspended force-responsive element, a serious problem exists in properly clamping and damping the force-responsive element. This is notably true of instruments used in geophysical prospecting for measuring the force of gravity or a gravity gradient and is particularly true of gravimeters. These instruments must measure gravitational forces with an extremely high degree of precision and the elastic suspensions must, therefore, be highly delicate. It is vital that the instrument should be provided with a device for clamping the force-responsive element so that the instrument can be carried from place to place with ease and without injury. It must also be damped so that a reading can be obtained in a reasonable time.

Another highly important requirement of a clamping device for the purposes mentioned is that the clamping be accomplished without disturbing the mass or other force-responsive element from its rest position. This is essential in order to avoid stretching or otherwise distorting the elastic suspension or suspensions and to avoid hysteresis effects which are highly undesirable.

The solution of the problems set forth in the preceding paragraph are objects of my invention. It is also an object to provide a clamping device of the type described which will be easy to adjust and which will not cause sticking of the mass faces to the clamp faces. Other and more detailed objects, advantages and uses of my invention will become apparent as the description thereof proceeds.

While the invention is applicable to a variety of force-responsive instruments and in particular to various types of gravimeters, it will be described with particular reference to one type of gravimeter shown in the accompanying drawing.

In the drawing the same or corresponding parts in the various figures bear the same reference numerals. The figures can be described briefly as follows:

Figure 1 is an elevation with parts broken away showing a gravimeter to which my invention has been applied;

Figure 2 is a plan view taken along the line 2—2 of Figure 1;

Figure 3 is an elevation of an alternative form of clamp, shown for simplicity without the associated gravimeter; and Figure 4 is a plan view corresponding to Figure 3.

The particular type of gravimeter shown in Figures 1 and 2 includes a suspension head 11 (Figure 1) which may suitably be attached by means not shown to a case enclosing the instrument. This suspension head carries suspension pins 12. There are three such pins arranged in an equilateral triangle, but only two are visible in Figure 1. These suspension pins pass through corresponding openings in the suspension head 11 and are rotatably mounted therein. At their lower ends these suspension pins are clipped or otherwise fastened to fine suspension strands or other torsion filaments 13 which carry at their lower ends clips 14 which are fastened to mass 15. The principal part of this mass is Y-shaped as best seen in Figure 2 and the clips are connected with clip receivers 16, one of which is associated with each corner of the Y.

In operation one or more, preferably all, of the suspension pins 12 are twisted in order to apply torsion to the suspension strands 13, thereby causing the mass 15 to assume a rest or equilibrium position under the particular gravitational force prevailing. As shown, this mass is in such rest or equilibrium posititon. When the instrument is transported to points at which the gravitational force is different from that originally prevailing, this change in gravitational force increases or decreases the pull exerted by the mass 15 on the suspension strands 13 and causes it to undergo a very slight rotation, typically a small fraction of a second of arc. This rotation is measured, for instance by a mirror associated with mass 15 and a suitable system of optical levers, etc. but since this part of the system does not involve the present invention and is—or can be—conventional, it has been omitted from the drawing in the interest of simplicity.

In the form shown, mass 15 has a depending portion 17 which is preferably located with its center of mass in vertical line with the center of suspension and this projecting portion of the mass is utilized for clamping purposes. This projecting portion 17 has two plane parallel faces to which the clamp is applied. It will be understood, however, that the clamp can be applied to a portion of the mass projecting upwardly instead of downwardly or to any other appropriate part of the mass.

One of the main principles of operation of my new clamping mechanism is that three clamping points or clamping screws on one side of a portion of the mass are moved into contact with this portion of the mass while simultaneously a single point or screw is moved into contact with the other side of this portion of the mass. The single contact point is preferably located opposite the center of the triangle defined by the three contact points. This triangle is preferably equilateral but can be isosceles or irregular. The contact points are preferably arranged so that the portion of the mass clamped is approximately vertically disposed with reference to the center of suspension of the mass. The result of having three contact points on one side and one on the other is that firm clamping is always possible with minimum disturbance of the mass 15.

As shown, the clamping members are three screws 18 on one side and one screw 19 on the other side. These screws pass through the faces of threaded clamp carriers 20 and are locked in place by means of lock nuts 21. It will thus be seen that the clamping members are adjustable in order to arrange them in such position as to avoid disturbance of the mass from its normal position and to avoid any stretching of the elastic suspensions.

In the form shown in Figures 1 and 2 the right-hand end of clamp carrier 20 is dove-tailed to cooperate with guides 21' which permit and control sliding motion of the carriers. The clamp carriers are tapped to receive a threaded shaft 22. This shaft carries two sets of threads 23 and 24, one set being right-handed and the other set left-handed. In assembling the device the clamp carriers are threaded onto this shaft and arranged in position before guides 21' are installed. Shaft 22 passes through a journal member 25 attached to case 26. The shaft is rotated and locked in place by means of worm gear 27.

The device as shown in Figures 1 and 2 also includes a novel damping mechanism made up of vanes 28 attached to and depending from the three ends of the mass and corresponding base or stationary vanes 29 affixed to the case or frame 26 of the instrument by cap screws 30 passing through slots 31. These screws and slots make possible the adjustment of the positions of the stationary vanes with consequent adjustment of the damping mechanism.

An alternative type of clamping device is accordance with my invention is shown in Figures 3 and 4. In this form the two clamp carriers are pivoted in place by means of shafts 32 and are operated by means of shaft 22 as in the case of the form shown in Figures 1 and 2. It will be seen that this device operates similarly to that of Figures 1 and 2 in that the clamping screws on the two sides of the clamped part of the mass are constrained to move only towards or away from this part of the mass and by the same token towards or away from each other.

My invention has been described in connection with a three suspension gravimeter using a Y-shaped mass. It can, of course, be applied to instruments having any desired mass shape and any desired type of suspension. Thus, for instance, it can be applied to the two filament type of instrument described in Brown Patent Number 2,125,282 or to instruments using four or more suspension strands as well as to still more divergent types of force-responsive instruments.

Also, while I have described a clamping device in which there are three clamping points on one side and one on the other, it will be understood that more than three points can be used, preferably arranged at the corners of a regular polygon, with a single point on the other side, preferably located opposite the center of this polygon. However, the three-one system is preferred.

I claim:

1. A clamping device for a force-measurement instrument of the type including a force-responsive element and a suspension therefor, which comprises a first clamping member carrying three clamping points and a second clamping member carrying a single clamping point arranged symmetrically with respect to said three clamping points, said three clamping points and said single clamping point being arranged on opposite sides of a portion of said force-responsive element, and means for moving said two clamping members selectively into clamping and non-clamping positions with respect to said portion of said force-responsive element.

2. A clamping device for a force-measurement instrument of the type including a force-responsive element and a suspension therefor, which comprises a first clamping member carrying three adjustable clamping points and a second clamping member carrying a single adjustable clamping point arranged symmetrically with respect to said three clamping points, said three clamping points and said single clamping point being arranged on opposite sides of a portion of said force-responsive element, and a single driving means for moving said two clamping members selectively into clamping and non-clamping positions with respect to said portion of said force-responsive element.

3. A clamping device for a gravimeter having a gravity-responsive mass said clamping device comprising two clamp carriers disposed on opposite sides of the mass to be clamped, one of said clamp carriers carrying at least three clamping points, the other of said clamp carriers carrying a single clamping point, and means for moving said two clamping members selectively into clamping and non-clamping positions with respect to said gravity-responsive mass.

4. A clamping device for a gravimeter having a gravity-responsive mass, said clamping device comprising two clamp carriers disposed on opposite sides of the mass to be clamped, one of said clamp carriers carrying at least three adjustable clamping screws arranged substantially at the corners of a regular polygon, the other of said clamp carriers carrying a single adjustable clamping screw directed towards said first-mentioned clamping screws and arranged substantially opposite the center of said polygon, and means for moving said two clamping members selectively into clamping and non-clamping positions with respect to said gravity-responsive mass.

JOHN L. BIBLE.

DISCLAIMER 2,225,582.—*John L. Bible*, Tulsa, Oklahoma. GRAVITY METER CLAMP. Patent dated December 17, 1940. Disclaimer filed October 22, 1943, by the assignee, *Stanolind Oil and Gas Company*.

Hereby enters this disclaimer to claim 3 in said specification.

(*Official Gazette, November 16, 1943*.)